(12) United States Patent
Iwade

(10) Patent No.: US 9,197,261 B2
(45) Date of Patent: Nov. 24, 2015

(54) VEHICLE-MOUNTED AUDIO DEVICE AND AUTOMOBILE

(75) Inventor: Katsuhiko Iwade, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 344 days.

(21) Appl. No.: 13/269,327

(22) Filed: Oct. 7, 2011

(65) Prior Publication Data

US 2012/0213384 A1     Aug. 23, 2012

Related U.S. Application Data

(63) Continuation of application No. 11/773,805, filed on Jul. 5, 2007, now abandoned.

(30) Foreign Application Priority Data

Jul. 25, 2006 (JP) ................................. 2006-202005

(51) Int. Cl.
    *H04B 1/06*     (2006.01)
    *H04B 1/08*     (2006.01)
    (Continued)

(52) U.S. Cl.
    CPC ................ *H04B 1/082* (2013.01); *B60R 11/02* (2013.01); *B60R 11/0241* (2013.01); *B60R 11/0264* (2013.01); *B60R 2011/0075* (2013.01); *B60R 2011/0082* (2013.01); *B60R 2011/0084* (2013.01); *B60R 2011/027* (2013.01); *B60R 2011/0294* (2013.01)

(58) Field of Classification Search
    USPC .............. 381/86, 87, 361, 386; 361/752, 754; 455/345–348
    See application file for complete search history.

(56) References Cited

U.S. PATENT DOCUMENTS 3,863,985 A     2/1975  Zuber
4,199,204 A *   4/1980  Hodsdon et al. ............... 312/7.1
                        (Continued)

FOREIGN PATENT DOCUMENTS

CN          2520094 Y     11/2002
CN          2712723        7/2005
                        (Continued)

OTHER PUBLICATIONS

Office Action issued Jun. 21, 2011, in Japanese Patent Application No. 2006-202005 with English translation.
(Continued)

*Primary Examiner* — Disler Paul
(74) *Attorney, Agent, or Firm* — Oblon, McClelland, Maier & Neustadt, L.L.P.

(57) ABSTRACT

The present invention provides a vehicle-mounted audio device including a casing, a tuner, an audio output unit, a housing chamber, an opening of the housing chamber, a housing, a lock mechanism, and a casing connector. The tuner is disposed in the casing. The audio output unit is for amplifying and outputting an audio signal supplied from the tuner. The housing chamber is defined in the casing. The opening is defined in a front panel of the casing. The housing is for accommodating a portable audio device. The housing is removably housed in the housing chamber through the opening. The lock mechanism is for selectively locking the housing in the housing chamber and unlocking the housing from the housing chamber. The casing connector is electrically connected to the audio output unit and disposed in the housing for disengageably connecting to an audio signal output connector of the portable audio device.

19 Claims, 20 Drawing Sheets

(51) Int. Cl.
B60R 11/02 (2006.01)
B60R 11/00 (2006.01)

(56) References Cited

U.S. PATENT DOCUMENTS

| | | | |
|---|---|---|---|
| 4,807,292 A * | 2/1989 | Sorscher | 381/86 |
| 5,864,627 A * | 1/1999 | Kim | 381/86 |
| 5,974,333 A * | 10/1999 | Chen | 455/569.2 |
| 6,946,971 B2 * | 9/2005 | Matumoto et al. | 340/12.22 |
| 6,989,993 B2 | 1/2006 | Amari et al. | |
| 7,216,926 B2 | 5/2007 | Hampel | |
| 2004/0121645 A1 * | 6/2004 | Postrel | 439/374 |
| 2006/0039263 A1 * | 2/2006 | Trotabas | 369/86 |
| 2006/0256475 A1 | 11/2006 | Lindsay et al. | |
| 2006/0277555 A1 * | 12/2006 | Howard et al. | 720/600 |
| 2007/0223726 A1 | 9/2007 | Dunn | |

FOREIGN PATENT DOCUMENTS

| | | |
|---|---|---|
| JP | 3-102192 U | 10/1991 |
| JP | 5-110267 | 4/1993 |
| JP | 5-226851 | 9/1993 |
| JP | 6-72254 | 3/1994 |
| JP | 7-24660 U | 5/1995 |
| JP | 8-55467 | 2/1996 |
| JP | 9-198572 A | 7/1997 |
| JP | 3042460 U | 8/1997 |
| JP | 3045385 U | 11/1997 |
| JP | 10-210122 | 8/1998 |
| JP | 11-20556 | 1/1999 |
| JP | 11-96741 | 4/1999 |
| JP | 11-146049 A | 5/1999 |
| JP | 2000-52884 | 2/2000 |
| JP | 2000-115315 A | 4/2000 |
| JP | 2000-332433 | 11/2000 |
| JP | 2001-128280 A | 5/2001 |
| JP | 2002-351475 A | 12/2002 |
| JP | 2004-359065 A | 12/2004 |
| JP | 2005-41441 | 2/2005 |
| JP | 2005-318382 A | 11/2005 |
| JP | 2006-48867 A | 2/2006 |

OTHER PUBLICATIONS

Office Action issued Dec. 20, 2011, in Japanese Patent Application No. 2006-202005 (with English-language translation).
Japanese Office Action issued Jun. 11, 2013 in Patent Application No. 2012-063814.
Korean Office Action issued Oct. 16, 2013, in Korea Patent Application No. 10-2007-0073765 (with English translation).
Japanese Office Action issued Feb. 25, 2014 in Japanese Patent Application No. 2012-063814.
Korean Notice of Final Rejection issued on Apr. 29, 2014 in Korean Patent Application No. 10-2007-73765, with English language translation (7 pages).
Japanese Office Action issued Sep. 2, 2014 in Japanese Patent Application No. 2012-063814.
Office Action issued Sep. 6, 2015 in Chinese Patent Application No. 201410166544.5 (with English translation).

* cited by examiner

VEHICLE-MOUNTED AUDIO DEVICE AND AUTOMOBILE

CROSS REFERENCES TO RELATED APPLICATIONS

This application is a Continuation of and is based upon and claims the benefit of priority under 35 U.S.C. §120 for U.S. Ser. No. 11/773,805, filed Jul. 5, 2007. The present invention contains subject matter related to Japanese Patent Application JP 2006-202005 filed in the Japan Patent Office on Jul. 25, 2006, the entire contents of which being incorporated herein by reference.

BACKGROUND OF THE INVENTION

1. Field of the Invention

The present invention relates to a vehicle-mounted audio device and an automobile incorporating such a vehicle-mounted audio device.

2. Description of the Related Art

Heretofore, many vehicle-mounted audio devices on automobiles have a tuner for receiving AM and FM radio broadcasts and a player for reproducing CDs and DVDs. A source is selected from either one of the tuner and the player, and sounds of the source are output from the speakers in the passenger compartment of the automobile.

In recent years, various portable audio devices have been available in the art.

It is highly convenient to be able to use such a portable audio device in the passenger compartment of an automobile in combination with the speakers in the passenger compartment.

To allow a portable audio device to be used in the passenger compartment of an automobile, it has been proposed to keep a space in the passenger compartment, place a casing in the space, put the portable audio device in the casing, and use the portable audio device in combination with the speakers in the passenger compartment. For details, reference should be made to Japanese Patent Laid-open No. 2000-332433.

SUMMARY OF THE INVENTION

With the above proposed arrangement, however, the casing for accommodating the portable audio device needs to be provided in the passenger compartment, and tends to present an obstacle as it takes up a certain area in the limited space of the passenger compartment.

It is desirable to provide a vehicle-mounted audio device which includes a casing for accommodating a portable audio device therein, so that sounds of good quality can be reproduced by the portable audio device without impairing the aesthetic appearance of the passenger compartment of an automobile which incorporates the vehicle-mounted audio device, and an automobile which incorporates such a vehicle-mounted audio device.

According to an embodiment of the present invention, a vehicle-mounted audio device includes a casing, a tuner, an audio output unit, a housing chamber, an opening of the housing chamber, a housing, a lock mechanism, and a casing connector. The tuner is disposed in the casing. The audio output unit is for amplifying and outputting an audio signal supplied from the tuner. The housing chamber is defined in the casing. The opening is defined in a front panel of the casing. The housing is for accommodating a portable audio device and is removably housed in the housing chamber through the opening. The lock mechanism is for selectively locking the housing in the housing chamber and unlocking the housing from the housing chamber. The casing connector is electrically connected to the audio output unit and disposed in the housing for disengageably connecting to an audio signal output connector of the portable audio device.

According to an embodiment of the present invention, a vehicle-mounted audio device includes a casing, a tuner, an audio output unit, a housing chamber, an opening of the housing chamber, a housing, a lock mechanism, a controller, a casing connector, and an operation member. The tuner is disposed in the casing. The audio output unit is for amplifying and outputting an audio signal supplied from the tuner. The housing chamber is defined in the casing. The opening is defined in a front panel of the casing. The housing is for accommodating a portable audio device. The housing is removably housed in the housing chamber through the opening. The lock mechanism is for selectively locking the housing in the housing chamber and unlocking the housing from the housing chamber. The controller is disposed in the casing for controlling the tuner and the portable audio device accommodated in the housing. The casing connector is electrically connected to the audio output unit and disposed in the housing for disengageably connecting to an audio signal output connector of the portable audio device. The operation member is for sending a control signal for controlling the portable audio device to the controller.

According to an embodiment of the present invention, an automobile including a vehicle-mounted device includes a casing, a tuner, an audio output unit, a housing chamber, an opening of the housing chamber, a housing, a lock mechanism, and a casing connector. The tuner is disposed in the casing. The audio output unit is for amplifying and outputting an audio signal supplied from the tuner. The housing chamber is defined in the casing. The opening is defined in a front panel of the casing. The housing is for accommodating a portable audio device and is removably housed in the housing chamber through the opening. The lock mechanism is for selectively locking the housing in the housing chamber and unlocking the housing from the housing chamber. The casing connector is electrically connected to the audio output unit and disposed in the housing for disengageably connecting to an audio signal output connector of the portable audio device. The front panel of the casing faces the passenger compartment of the automobile.

According to an embodiment of the present invention, an automobile including a vehicle-mounted device includes a casing, a tuner, an audio output unit, a housing chamber, an opening of the housing chamber, a housing, a lock mechanism, a controller, a casing connector, and an operation member. The tuner is disposed in the casing. The audio output unit is for amplifying and outputting an audio signal supplied from the tuner. The housing chamber is defined in the casing. The opening is defined in a front panel of the casing. The housing is for accommodating a portable audio device and is removably housed in the housing chamber through the opening. The lock mechanism is for selectively locking the housing in the housing chamber and unlocking the housing from the housing chamber. The controller is disposed in the casing for controlling the tuner and the portable audio device accommodated in the housing. The casing connector is electrically connected to the audio output unit and disposed in the housing for disengageably connecting to an audio signal output connector of the portable audio device. The operation member is for sending a control signal for controlling the portable audio device to the controller. The front panel of the casing faces the passenger compartment of the automobile.

According to the embodiment of the present invention, the portable audio device is placed in the casing of the vehicle-mounted audio device while being electrically connected to the vehicle-mounted audio device.

Therefore, sounds of good quality can be reproduced from the portable audio device through a speaker in the passenger compartment. Since the portable audio device and a cable are accommodated in the casing of the vehicle-mounted audio device, the portable audio device and the cable do not take up a certain area in the limited space of the passenger compartment, and do not present an obstacle. The passenger compartment can thus have an improved aesthetic appearance.

Even if the passenger compartment does not have an extra space other than the space for installing the vehicle-mounted audio device, since the portable audio device is accommodated in the casing of the vehicle-mounted audio device installed in the passenger compartment, and the sounds of good quality are reproduced from the portable audio device through the vehicle-mounted audio device, the practical value of the vehicle-mounted audio device is increased.

DETAILED DESCRIPTION OF THE PREFERRED EMBODIMENTS

First Embodiment

A vehicle-mounted audio device according to a first embodiment of the present invention will be described below with reference to FIGS. 1 through 8.

Figure 1:
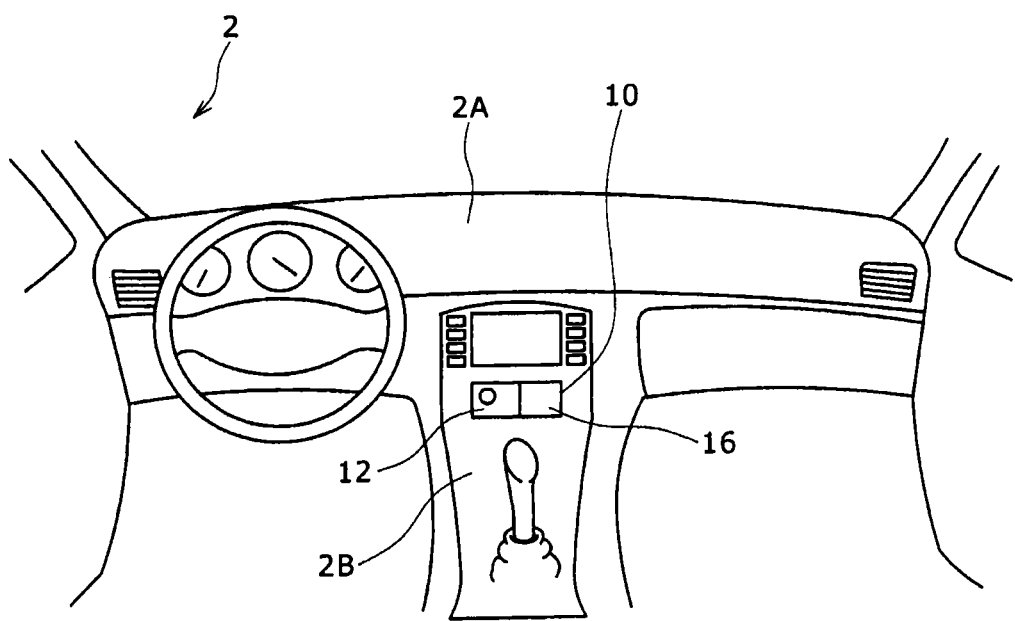
FIG. 1 is a view showing the passenger compartment of an automobile which incorporates a vehicle-mounted audio device according to a first embodiment of the present invention.
Figure 2:
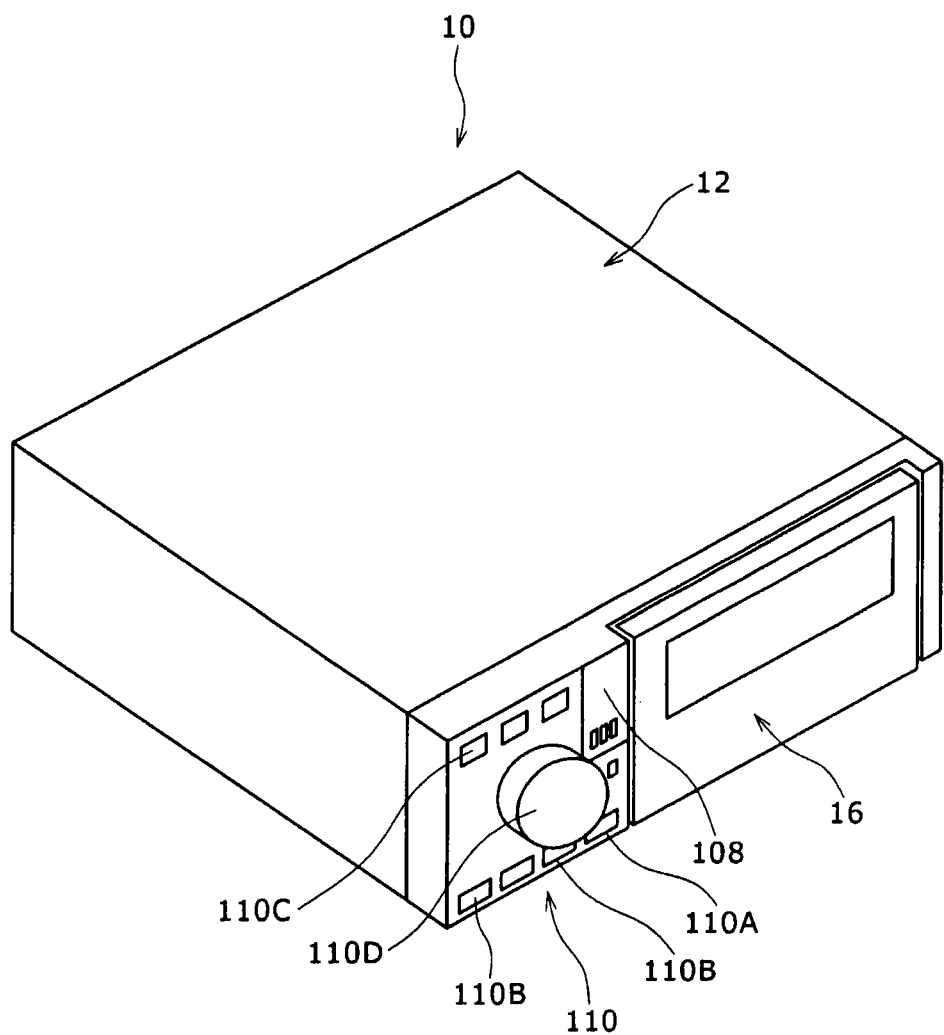
FIG. 2 is a perspective view of a vehicle-mounted audio device.
Figure 3:
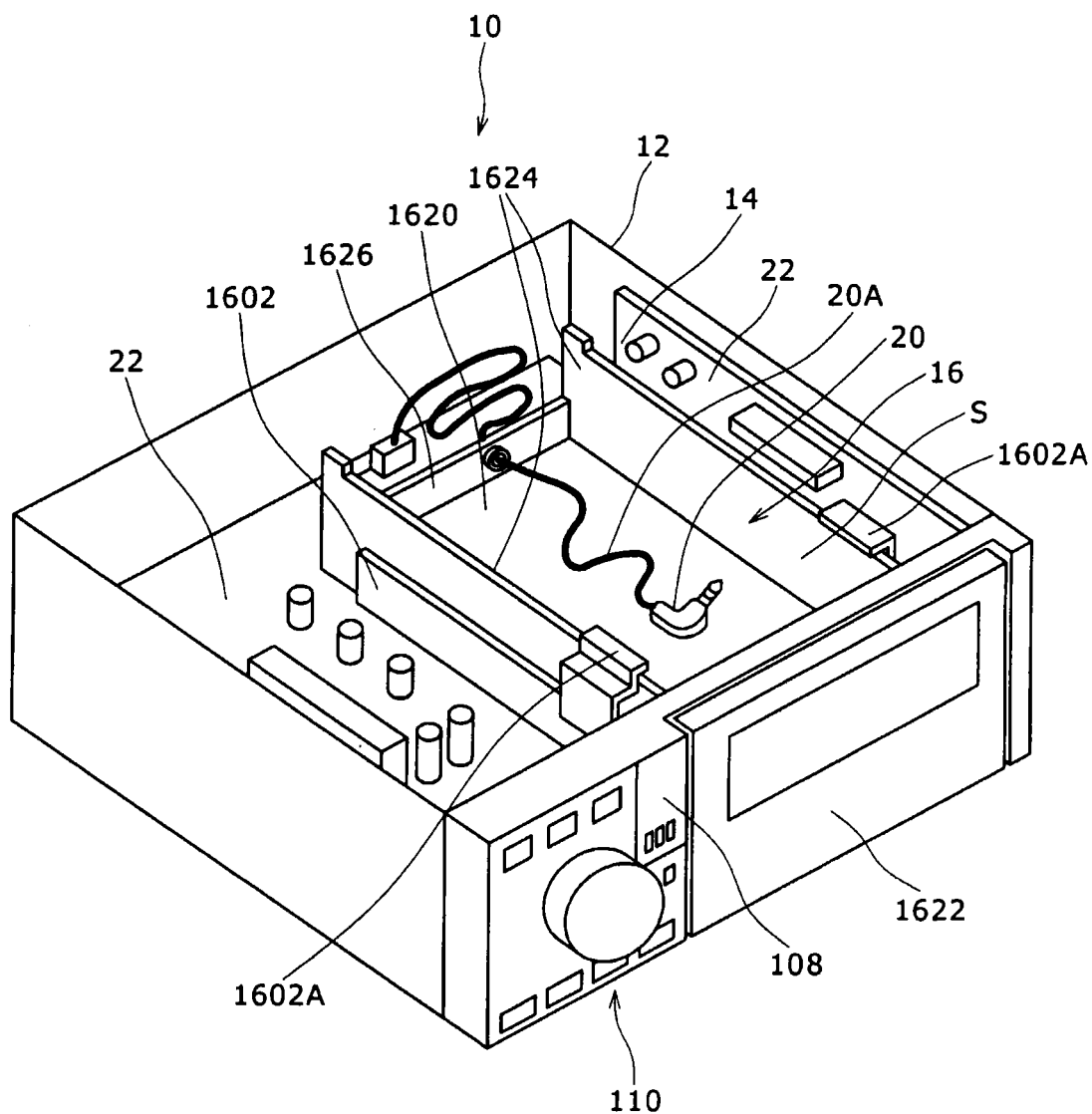
FIG. 3 is a perspective view of the vehicle-mounted audio device with an upper plate of a casing thereof being omitted from illustration.
Figure 4:
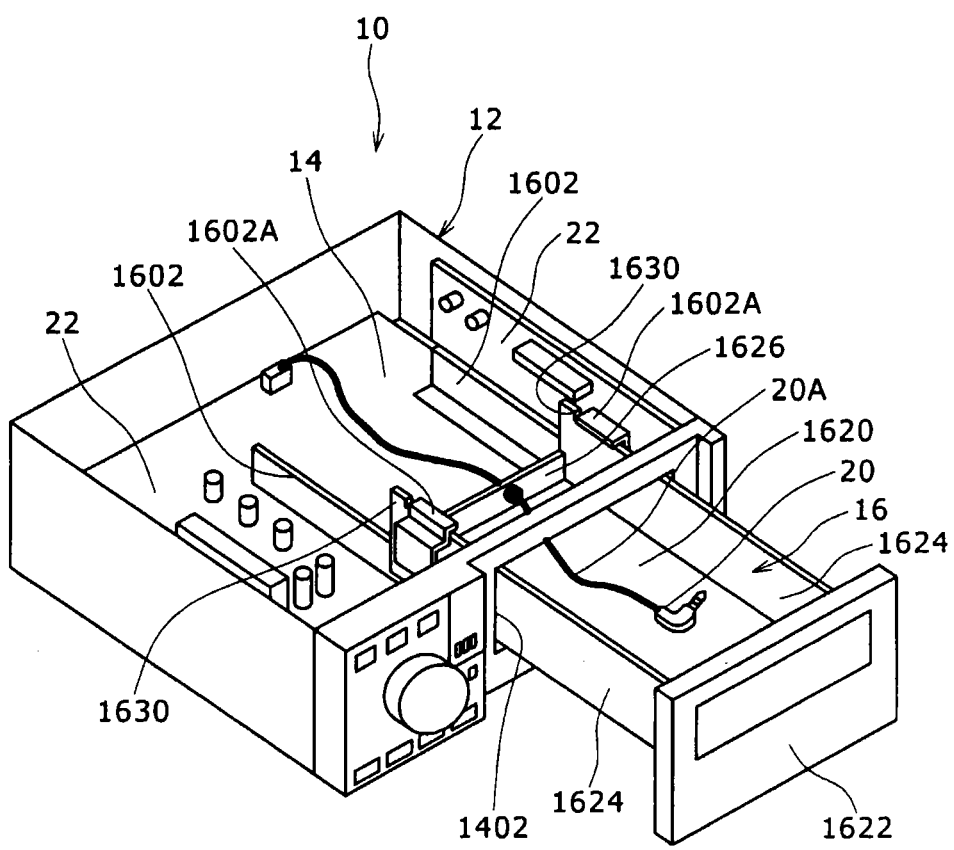
FIG. 4 is a perspective view of the vehicle-mounted audio device with the upper plate of the casing thereof being omitted from illustration, the view showing a housing that is pulled out.
Figure 5:
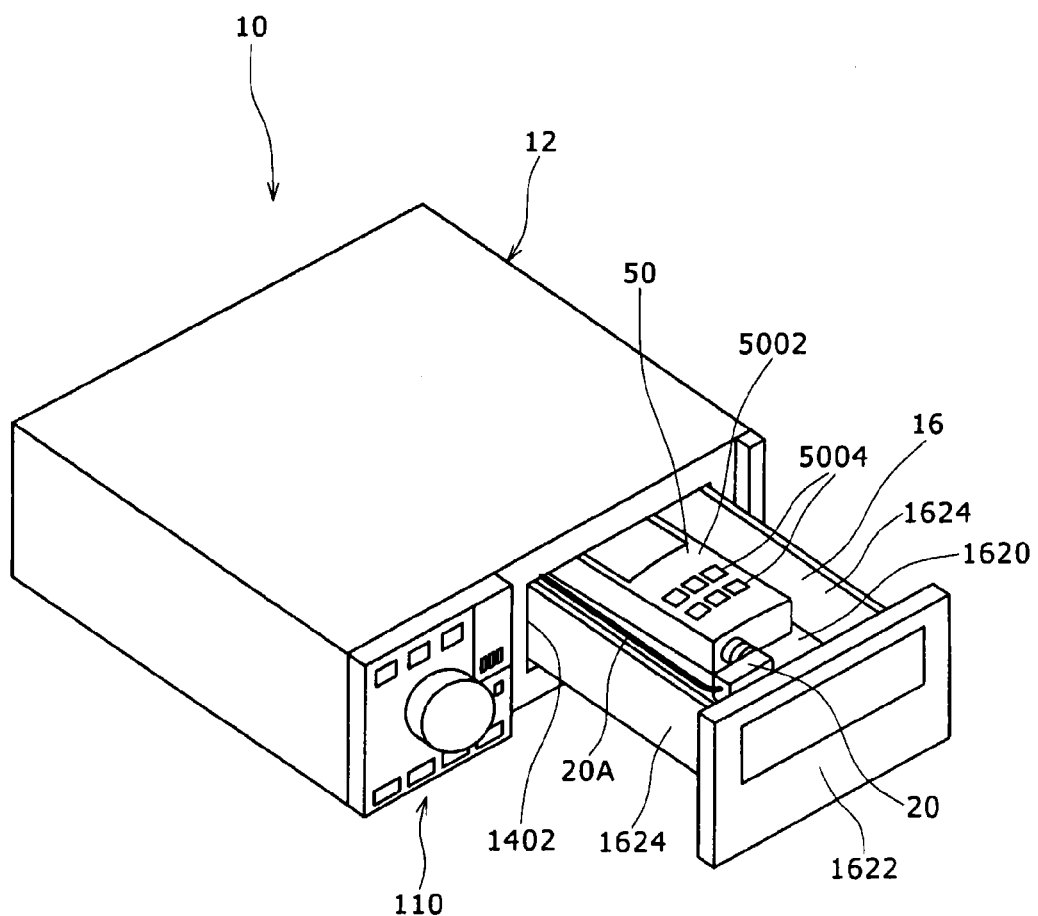
FIG. 5 is a perspective view of the vehicle-mounted audio device with a portable audio device being placed in the housing that is pulled out.
Figure 6:
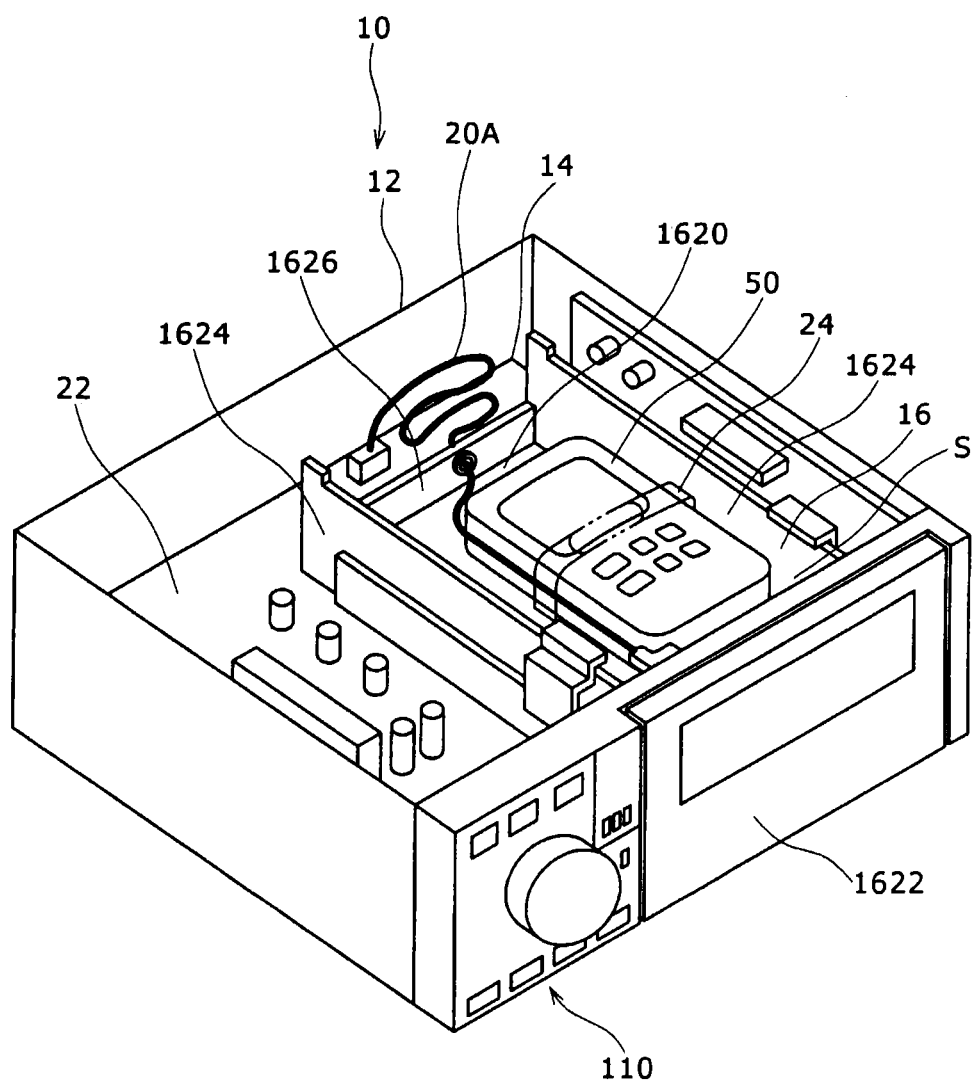
FIG. 6 is a perspective view of the vehicle-mounted audio device with the upper plate of the casing thereof being omitted from illustration, the view showing the housing being retracted with the portable audio device being placed therein.
Figure 7:
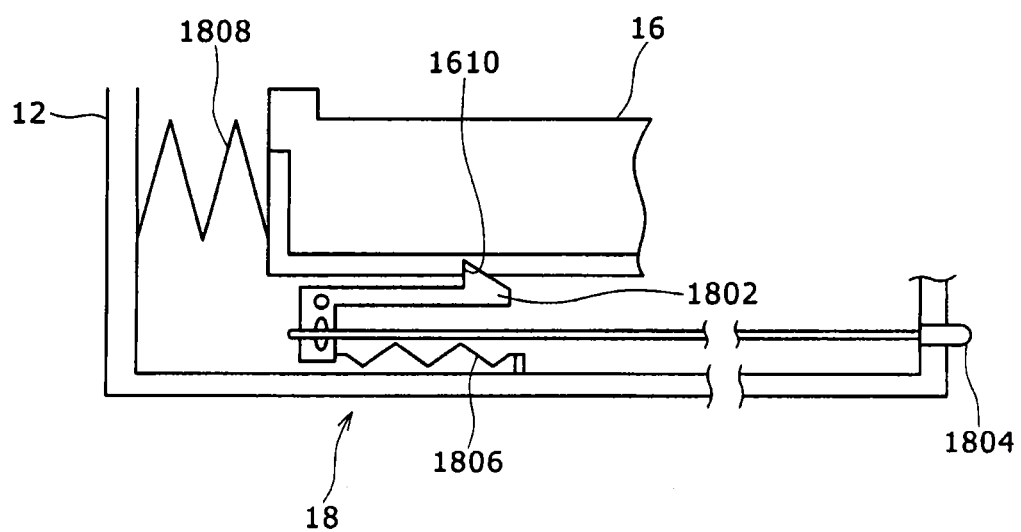
FIG. 7 is a fragmentary side elevational view of a lock mechanism.
Figure 8:
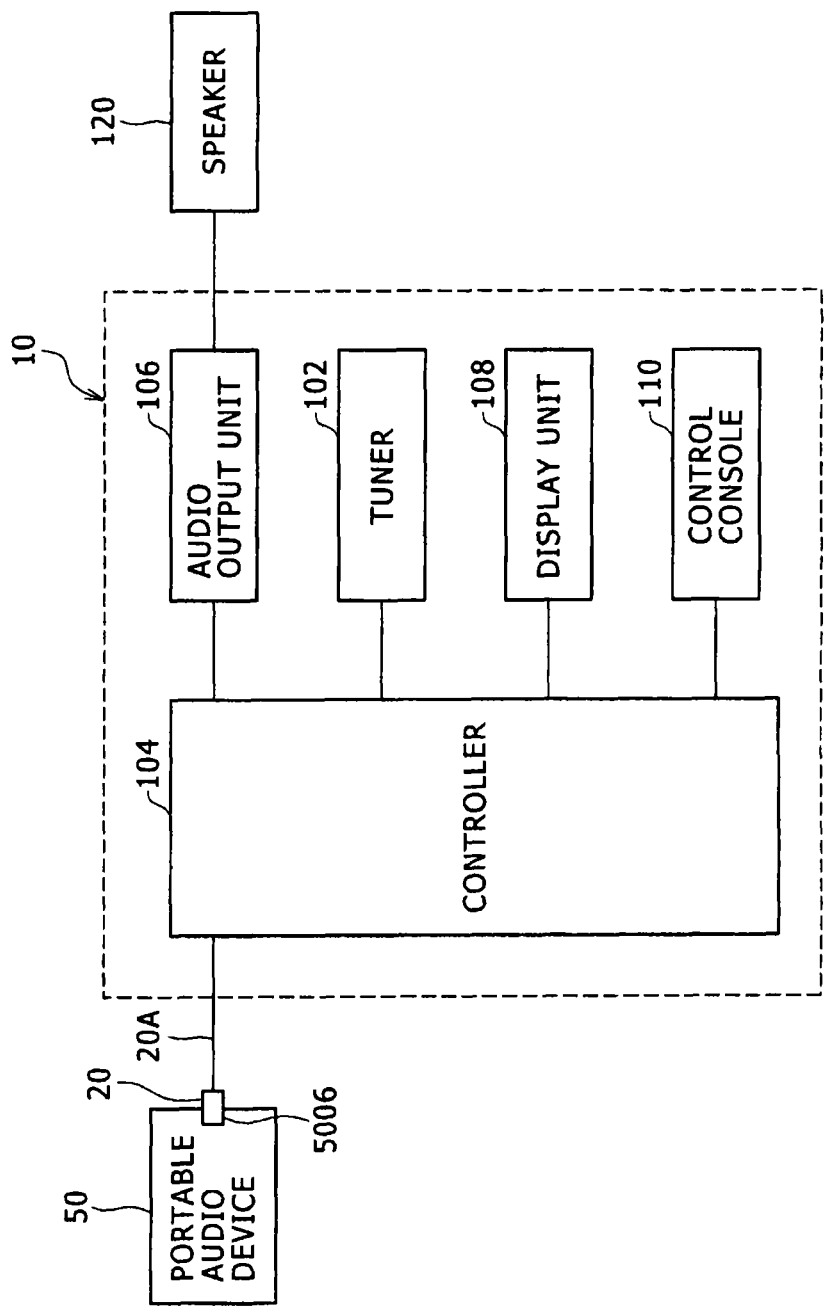
FIG. 8 is a block diagram of a control system of the vehicle-mounted audio device.

FIG. 1 shows the passenger compartment of an automobile which incorporates a vehicle-mounted audio device according to the first embodiment. FIG. 2 shows in perspective the vehicle-mounted audio device. FIG. 3 shows in perspective the vehicle-mounted audio device with an upper plate of a casing thereof being omitted from illustration. FIG. 4 shows in perspective the vehicle-mounted audio device with the upper plate of the casing thereof being omitted from illustration, the view showing a housing that is pulled out. FIG. 5 shows in perspective the vehicle-mounted audio device with a portable audio device being placed in the housing that is pulled out. FIG. 6 shows in perspective the vehicle-mounted audio device with the upper plate of the casing thereof being omitted from illustration, the view showing the housing being retracted with the portable audio device being placed therein. FIG. 7 shows a lock mechanism in fragmentary side elevation. FIG. 8 shows in block form a control system of the vehicle-mounted audio device.

As shown in FIGS. 1 and 2, a vehicle-mounted audio device 10 according to the first embodiment allows a portable audio device 50 (see FIG. 8) to output an audio signal from a speaker 120 (see FIG. 8) installed in the passenger compartment 2 of an automobile.

The portable audio device 50 may include any of various known devices including an audio player which employs a disk-shaped recording medium (optical disk) such as a CD, an MD, a DVD, or the like, and an audio player which employs a built-in memory, a memory card, a hard disk, or the like.

The portable audio device 50 has a function to reproduce data such as music contents recorded in a disk-shaped recording medium, a built-in memory, a memory card, or a hard disk, and output the reproduced data as an audio signal.

As shown in FIG. 5, the portable audio device 50 has a plurality of operation members 5004 including a power supply switch, a reproduction button, a music feed button, a stop button, a volume adjustment button, etc., on the front surface of a casing 5002 thereof.

As shown in FIG. 3, the vehicle-mounted audio device 10 includes a casing 12, a tuner 102 (see FIG. 8), an audio output unit 106 (see FIG. 8), a housing chamber 14, a housing 16, a lock mechanism 18 (see FIG. 7), and a casing connector 20.

As shown in FIG. 1, the casing 12 is placed in a vehicle body member such as a dashboard 2A or a center console panel 2B that is positioned in the passenger compartment 2. The casing 12 has a front panel facing in the passenger compartment 2.

As shown in FIG. 8, the vehicle-mounted audio device 10 includes a main section including the tuner 102, a controller 104, the audio output unit 106, a display unit 108, and a control console 110.

The tuner 102 serves to receive AM and FM radio broadcasts transmitted from radio broadcast stations and output an audio signal.

The audio output unit 106 processes, e.g., amplifies, an audio signal supplied through the controller 104, and supplies the processed audio signal to the speaker 120 in the passenger compartment 2 to cause the speaker 120 to output a corresponding acoustic audio sound.

Specifically, the audio output unit 106 is connected through the controller 104 to the tuner 102 and the portable audio device 50, and causes the speaker 120 to output an acoustic audio sound based on an audio signal from the tuner 102 or the portable audio device 50.

The controller 104 and the portable audio device 50 are electrically connected to each other by a cable 20A when an audio signal output connector 5006 of the portable audio device 50 is detachably connected to the casing connector 20. The audio signal output connector 5006 is a headphone connector, for example, and includes a stereo mini-jack for transmitting an audio signal in left and right two channels.

The display unit 108 is controlled by the controller 104 to display operating states of the tuner 102 and the audio output unit 106 with characters, symbols, icons, or images.

The control console 110 is operated to instruct the tuner 102 and the sound output unit 106 to operate, and supplies a control signal depending on the operation of the control console 110 to the controller 104.

The controller 104 serves to control the tuner 102, the sound output unit 106, the display unit 108, and the control console 110.

As shown in FIGS. 2 and 3, the casing 12 is in the form of a rectangular parallelepiped. The casing 12 houses therein various boards 22 on which there are mounted various electronic components of the tuner 102, the controller 104, and the sound output unit 106.

As shown in FIG. 4, a pair of parallel guide rails 1602 is disposed in the casing 12 for guiding the housing 16 for movement into and out of the casing 12. Stops 1602A for stopping the housing 16 against unwanted movement out of the casing 12 are disposed near the respective front ends of the guide rails 1602.

As shown in FIG. 2, the control console 110 and the display unit 108 are disposed on a left side portion of the front panel of the casing 12.

The control console 110 has a plurality of operation members including a source selecting switch 110A for selecting a source whose audio data is to be reproduced by the vehicle-mounted audio device 10, a channel selecting switch 110B for selecting a broadcasting station whose broadcasts are to be received by the tuner 102, a power supply switch 110C, and a volume knob 110D for adjusting the level of reproduced sounds.

According to the embodiment of the present embodiment, each time the source selecting switch 110A is operated, the controller 104 successively selects reception bands (AM and FM) of the tuner 102 and the portable audio device 50.

As shown in FIG. 4, the housing chamber 14 is disposed in a right side portion of the casing 12 and has an opening 1402 defined in a right side portion of the front panel of the casing 12.

The housing 16 is removably accommodated in the housing chamber 14.

As shown in FIGS. 3 through 6, the housing 16 serves to house the portable audio device 50 therein. The housing 16 is open at least upwardly so that when the housing 16 is pulled out of the housing chamber 14, the portable audio device 50 can be taken into and out of the housing 16.

The housing 16 includes a bottom plate 1620 which is elongate in the directions in which the housing 16 is movable, a front plate 1622 extending vertically from the front edge of the bottom plate 1620, a pair of side plates 1624 extending vertically from the respective side edges of the bottom plate 1620, and a rear plate 1626 extending vertically from the rear edge of the bottom plate 1620.

When the housing 16 is pushed into the housing chamber 14, the casing 12 and the housing 16 jointly make up a closed space S (see FIG. 3) for accommodating the portable audio device 50 therein in the housing chamber 14. At this time, the opening 1402 is closed by the front plate 1622, with the closed space S being specifically defined by the casing 12, the front plate 1622, the side plates 1624, and the rear plate 1626.

As shown in FIG. 6, the housing 16 includes a holder 24 for holding the portable audio device 50 immovable in the housing 16.

The holder 24 includes a surface fastener strip having longitudinal ends secured to the housing 16. When the portable audio device 50 is immovably held in the housing 16 by the holder 24, the portable audio device 50 is prevented from moving into inner surfaces of the housing 16 and the casing 12 due to vibrations and shocks applied while the automobile is running. Therefore, the portable audio device 50 held in the housing 16 by the holder 24 is allowed to operate stably and remain durable for a long time.

As shown in FIG. 7, the lock mechanism 18 serves to keep the housing 16 held stably in the housing chamber 14 against vibrations and shocks applied while the automobile is running, and also to release the housing 16 from the housing chamber 14 for allowing the portable audio device 50 to be taken into and out of the housing 16.

The lock mechanism 18 includes an engaging finger 1802 for engaging in an engaging groove 1610 defined in the housing 16, a spring 1806 for normally biasing the engaging finger 1802 to engage in the engaging groove 1610 and also biasing an unlock button 1804 to project out of the casing 12, and a spring 1808 for biasing the housing 16 to project out of the opening 1402.

When the housing 16 is pushed through the opening 1402 into the housing chamber 14, the engaging finger 1802 engages in the engaging groove 1610 under the bias of the spring 1806, keeping the housing 16 in the housing chamber 14, i.e., positioning the housing 16 in a stored position in the housing 14. When the unlock button 1804 is subsequently pushed against the bias of the spring 1806, the engaging finger 1802 disengages from the engaging groove 1804, and the housing 16 is pushed out of the housing chamber 14 under the bias of the spring 1808 until the housing 16 is positioned in a projected position where the front plate 1622 can be gripped. The lock mechanism 18 is not limited to the illustrated structure, but may be of any of various known structures.

The side plates 1624 of the housing 16 have respective teeth 1630 on their upper edges at their rear ends for abutting against the respective stops 1602A to determine a foremost position in which the housing 16 is pulled maximally from the housing chamber 14 through the opening 1402. The portable audio device 50 is brought into and out of the housing 16 when the housing 16 is in the foremost position.

As shown in FIG. 3, the casing connector 20 is attached to the distal end of the cable 20A which extends through the rear plate 1626 and is positioned in the housing 16. When the housing 16 moves into and out of the housing chamber 14, the casing connector 20 can move with the housing 16.

A process of reproducing music contents of the portable audio device 50 using the vehicle-mounted audio device 10 will be described below.

First, the lock mechanism 18 is operated to release the housing 16 into the projected position. The front plate 1622 of the housing 16 is gripped and the housing 16 is pulled forward into the foremost position as shown in FIG. 4.

Then, as shown in FIG. 5, the portable audio device 50 is placed into the housing 16, and the casing connector 20 is connected to the audio signal output connector 5006. Then, the portable audio device 50 is immovably fastened to the housing 16 by the holder 24 (see FIG. 6).

Then, as shown in FIG. 6, the housing 16 is pushed into the casing 12 until the housing 16 is locked in the stored position in the housing chamber 14 by the lock mechanism 18. In the housing chamber 14, the portable audio device 50, the casing connector 20, and the cable 20A are now accommodated in the closed chamber S. The portable audio device 50 and the interior of the casing 12 are thus protected from dust and dirt.

Before the housing 16 is pushed into the casing 12, some of the operation members 5004 of the portable audio device 50 are operated to start reproducing music contents of the portable audio device. The power supply switch 1100 of the control console 110 is operated to turn on the power supply of the vehicle-mounted audio device 10, and the source selecting switch 110A is operated to select the portable audio device 50.

An audio signal output from the portable audio device 50 is supplied through the controller 104 and the audio output unit 106 to the speaker 120, which outputs a corresponding sound into the passenger compartment 2. The level of the sound can be adjusted by turning the volume knob 110D.

According to the embodiment of the present embodiment, the portable audio device 50 is placed in the casing 12 of the vehicle-mounted audio device 10 while being electrically connected to the vehicle-mounted audio device 10.

Since an audio signal supplied from the portable audio device 50 is directly transmitted to the vehicle-mounted audio device 10, not through an intermediary such as an FM transmitter, the audio signal is not unduly degraded as it is not converted into an FM signal or the like, and hence the sounds of good quality can be reproduced from the portable audio device 50. In addition, because the portable audio device 50 and the cable 20A are accommodated in the casing 12 of the vehicle-mounted audio device 10, the portable audio device 50 and the cable 20A do not take up a certain area in the limited space of the passenger compartment 2, and the passenger compartment 2 can have an improved aesthetic appearance.

In the embodiment of the present invention, the portable audio device 50 is accommodated in the casing 12 of the vehicle-mounted audio device 10 installed in the passenger compartment 2, and the sounds of good quality are reproduced from the portable audio device 50 through the vehicle-mounted audio device 10. Thus, even if the vehicle body member such as the dashboard 2A or the center console panel 2B that is positioned in the passenger compartment 2 does not have an extra space other than the space for installing the vehicle-mounted audio device 10, the practical value of the vehicle-mounted audio device 10 is increased without impairing the aesthetic appearance of the passenger compartment 2.

Furthermore, as long as the portable audio device 50 is of a size that can be placed in the housing 16, music contents of the portable audio device 50 can be reproduced through the vehicle-mounted audio device 10 regardless of the type of the portable audio device 50. Accordingly, the vehicle-mounted audio device 10 is highly versatile as to the portable audio device 50 that can be used.

Second Embodiment

A vehicle-mounted audio device according to a second embodiment of the present invention will be described below with reference to FIG. 9.

Figure 9:
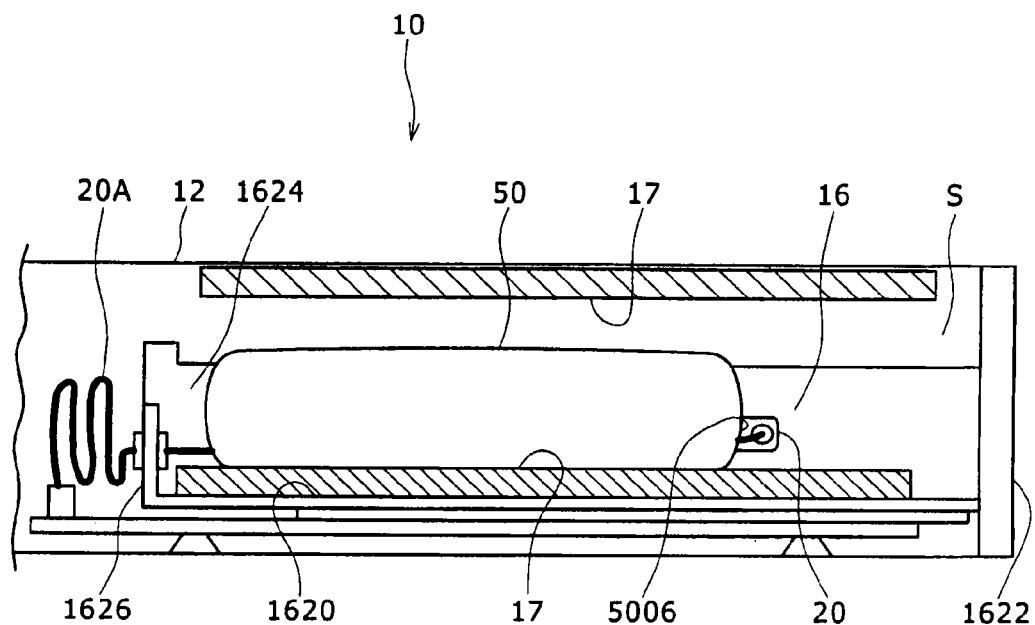
FIG. 9 is a vertical cross-sectional view of a vehicle-mounted audio device according to a second embodiment of the present invention.

FIG. 9 shows in vertical cross section a vehicle-mounted audio device 10 according to the second embodiment.

According to the second embodiment, the vehicle-mounted audio device 10 is designed to reduce vibrations and shocks that are applied to the portable audio device 50 housed in the housing 16 while the automobile is running.

As shown in FIG. 9, a thin cushioning pad (shock absorbing material) 17 such as of sponge for reducing vibrations and shocks is mounted on the bottom plate 1620 of the housing 16 substantially over its entire upper surface, and another thin cushioning pad 17 is mounted on an upper wall of the housing chamber 14, i.e., on the lower surface of the upper plate of the casing 12, which faces the portable audio device 50 when the housing 16 is placed in the housing chamber 14.

The vehicle-mounted audio device 10 according to the second embodiment offers the same advantages as the vehicle-mounted audio device 10 according to the first embodiment. In addition, even when the portable audio device 50 moves in the housing 16 due to vibrations and shocks applied while the automobile is running, and hits the bottom plate 1620 of the housing 16 and the upper plate of the casing 12, since the cushioning pads 17 dampen the vibrations and shocks, the portable audio device 50 operates stably and remains durable for a long time.

With the cushioning pads 17 being used, the holder 24 may be dispensed with. Other cushioning pads 17 may be mounted on the rear surface of the front plate 1622, the inner surfaces of the side plates 1624, and the front surface of the rear plate 1626. The use of these additional cushioning pads 17 allows the portable audio device 50 to operate more stably and remain more durable for a long time.

Third Embodiment

A vehicle-mounted audio device according to a third embodiment of the present invention will be described below with reference to FIGS. 10 through 12.

Figure 10:
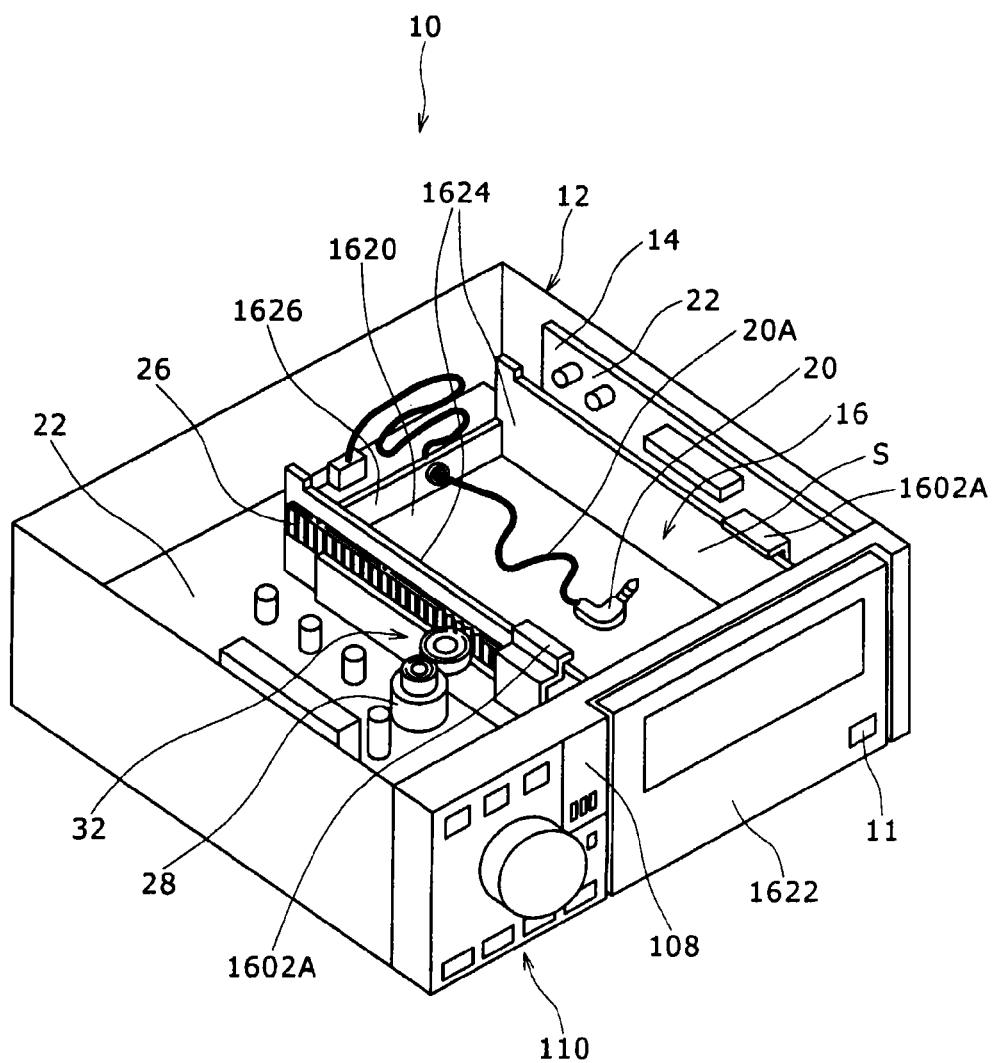
FIG. 10 is a perspective view of a vehicle-mounted audio device according to a third embodiment of the present invention, with an upper plate of a casing thereof being omitted from illustration.

FIG. 10 shows in perspective the vehicle-mounted audio device according to the third embodiment, with an upper plate of a casing thereof being omitted from illustration. FIG. 11 shows in side elevation a structure for moving a housing with an actuator. FIG. 12 shows in block form a control system of the vehicle-mounted audio device according to the third embodiment.

According to the third embodiment, the housing 16 is moved into and out of the housing chamber 14 by an actuator.

Figure 11:
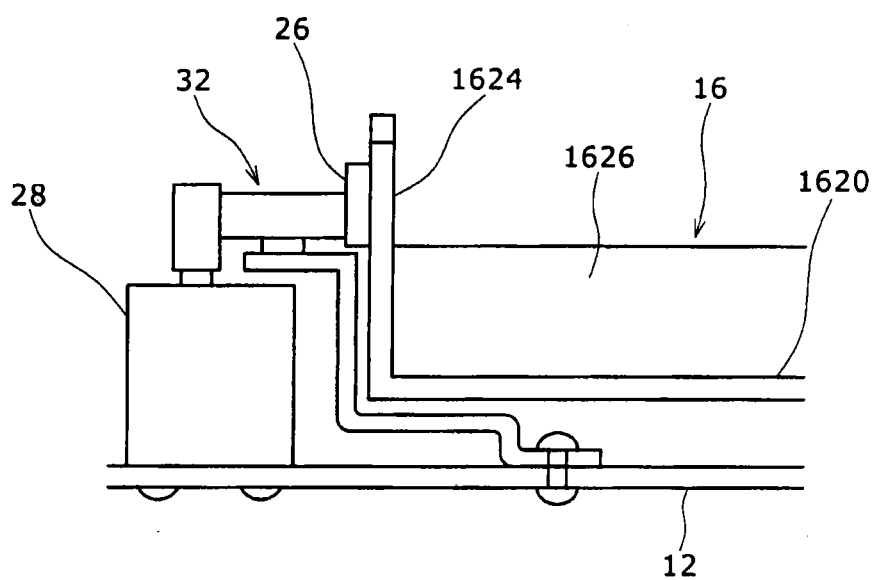
FIG. 11 is a side elevational view showing a structure for moving a housing with an actuator.
Figure 12:
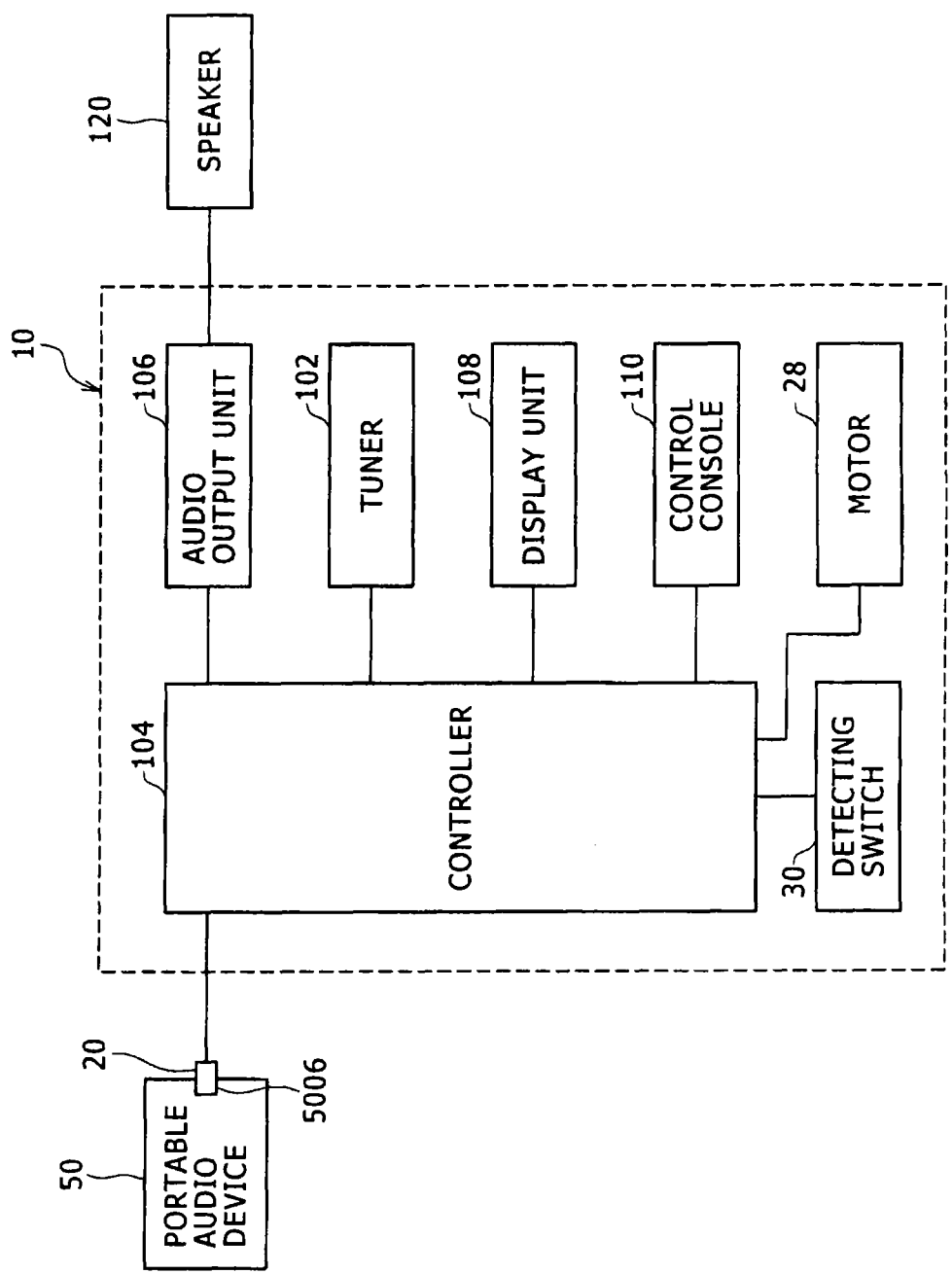
FIG. 12 is a block diagram of a control system of the vehicle-mounted audio device according to the third embodiment.

As shown in FIGS. 10 and 11, the actuator includes a motor 28 disposed in the casing 12, and a rack 26 is mounted on and extends along the outer surface of one of the side plates 1624 of the housing 16. The motor 28 is positioned on one of the boards 22 in the casing 12 which in facing relation to the rack 26. The control system includes a detecting switch 30 (see FIG. 12) for detecting when the housing 16 is in the stored position and the foremost position. When the motor 28 is energized, it rotates a gear mechanism 32 to actuate the rack 26 to move the housing 16 between the stored position and the foremost position.

The control console 110 includes an operation switch 11 (see FIG. 10) for moving the housing 16 to the stored position and the foremost position. The operation switch 11 is mounted on the front plate 1622, for example.

When the operation switch 11 is operated, the controller 104 energizes the motor 28 to rotate in a normal direction, causing the gear mechanism 32 to actuate the rack 26 to move the housing 16 from the stored position to the foremost position. At the time the detecting switch 30 detects when the housing 16 reaches the foremost position, the controller 104 de-energizes the motor 28 to hold the housing 16 in the foremost position.

When the operation switch 11 is operated again, the controller 104 energizes the motor 28 to rotate in a reverse direction, causing the gear mechanism 32 to actuate the rack 26 to move the housing 16 from the foremost position to the stored position. At the time the detecting switch 30 detects when the housing 16 reaches the stored position, the controller 104 de-energizes the motor 28 to hold the housing 16 in the stored position.

The vehicle-mounted audio device 10 according to the third embodiment offers the same advantages as the vehicle-mounted audio device 10 according to the first embodiment.

In the illustrated embodiment, the housing 16 is moved between the stored position and the foremost position by the motor 28, the gear mechanism 32, and the rack 26. However, any of various moving mechanisms may be employed to move the housing 16 between the stored position and the foremost position.

Fourth Embodiment

A vehicle-mounted audio device according to a fourth embodiment of the present invention will be described below with reference to FIGS. 13 and 14.

Figure 13:
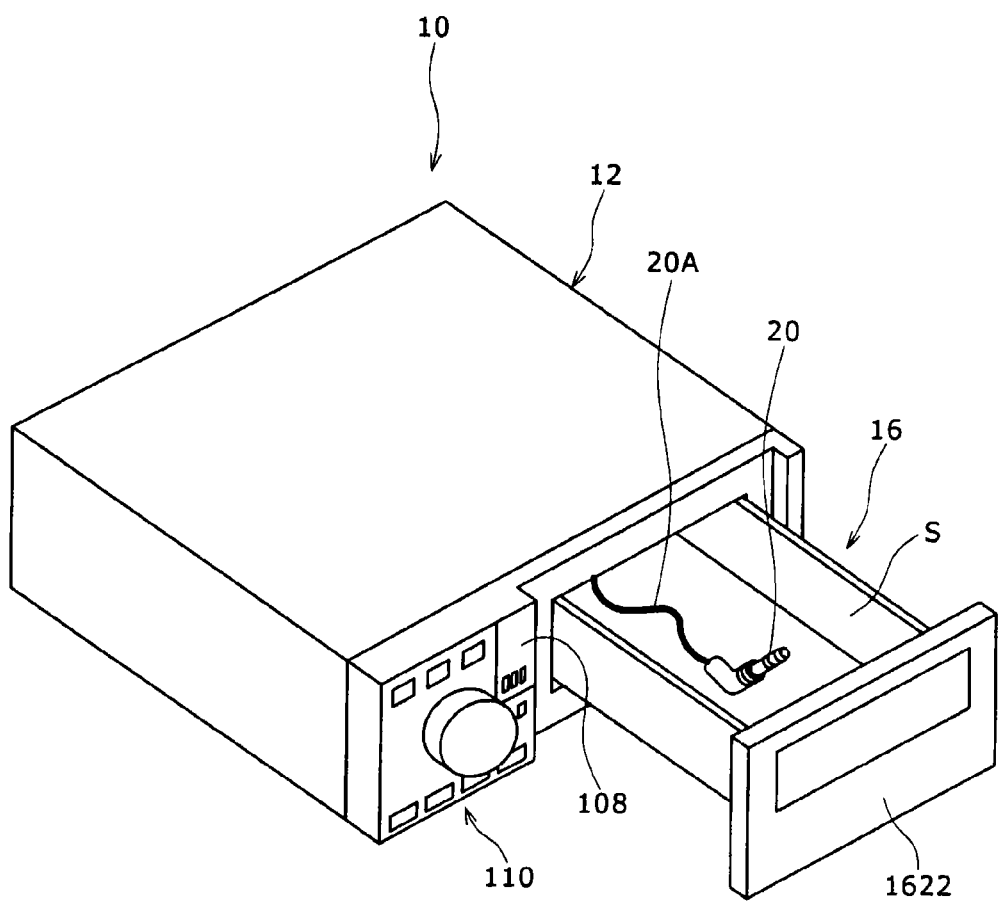
FIG. 13 is a perspective view of a vehicle-mounted audio device according to a fourth embodiment of the present invention, the view showing a housing being pulled out.
Figure 14:
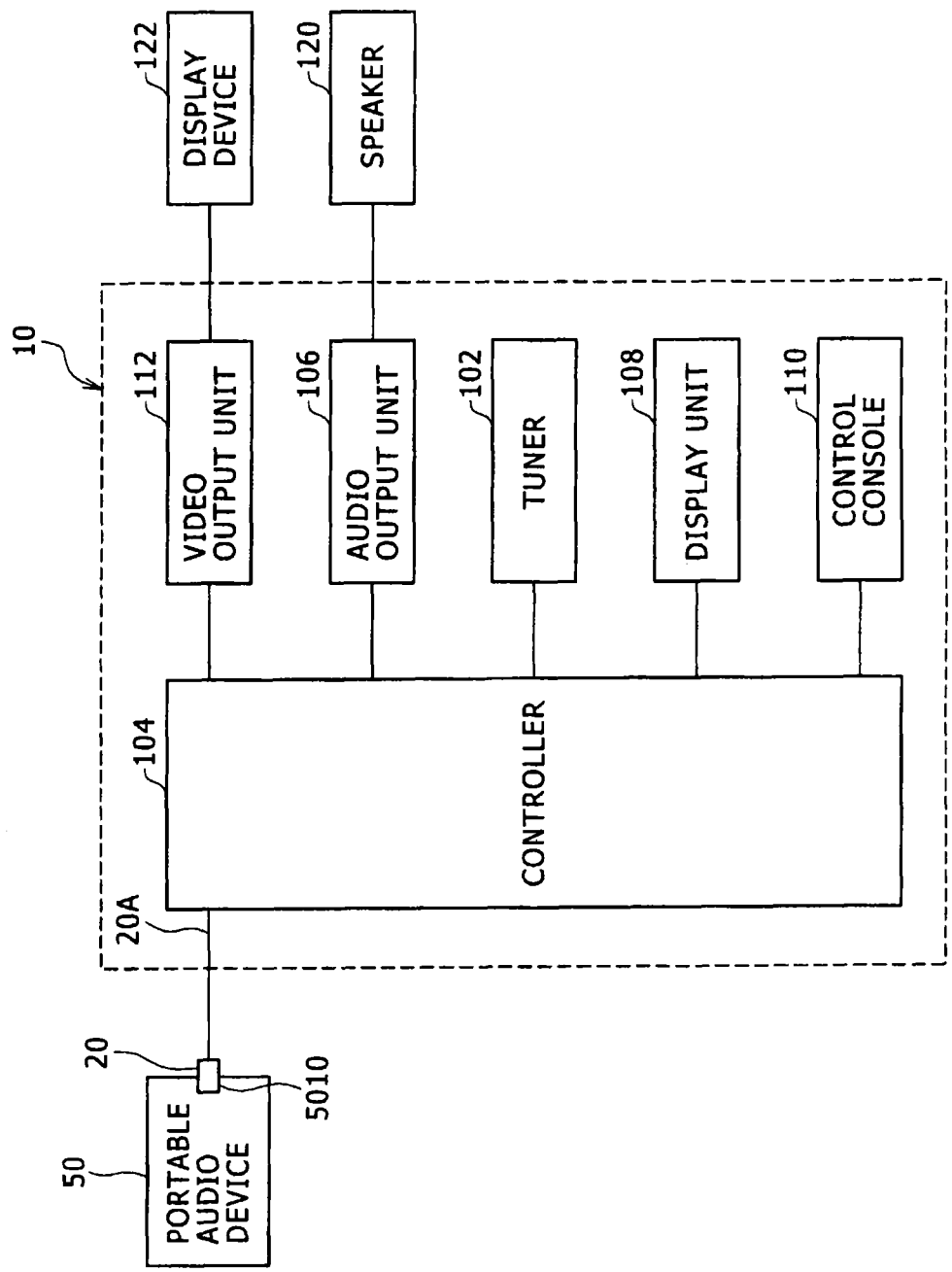
FIG. 14 is a block diagram of a control system of the vehicle-mounted audio device according to the fourth embodiment.

FIG. 13 shows in perspective a vehicle-mounted audio device according to the fourth embodiment, the view showing a housing being pulled out, and FIG. 14 shows in block form a control system of the vehicle-mounted audio device according to the fourth embodiment.

According to the fourth embodiment, the portable audio device 50 is capable of reproducing music contents and video contents (either one or both of moving image data and still image data), and of outputting a video signal and an audio signal. The video signal from the portable audio device 50 is supplied to a display device electrically connected to the vehicle-mounted audio device 10 for displaying an image on the display device.

As shown in FIG. 14, the portable audio device 50 has a single audio signal/video signal output connector 5010 for outputting both audio signals in left and right channels and a video signal.

When the casing connector 20 (see FIG. 13) is connected to the audio signal/video signal output connector 5010, the casing connector 20 can supply three signals, i.e., audio signals in left and right channels and a video signal, through the cable 20A to the controller 104. In the present embodiment, the casing connector 20 is integrally combined with a casing connector for video signals.

As shown in FIG. 14, the vehicle-mounted audio device 10 includes a video output unit 112. The video output unit 112 processes a video signal supplied from the controller 104, and supplies the processed video signal to a display device 122 incorporated in the passenger compartment 2 for displaying a corresponding image on the display device 122. The display device 122 may be provided as a standalone video device or as the display device of a car navigation system. The display device of a car navigation system is incorporated in the dashboard 2A or the center console panel 2B in the passenger compartment 2.

The vehicle-mounted audio device 10 according to the fourth embodiment offers the same advantages as the vehicle-mounted audio device 10 according to the first embodiment.

In the fourth embodiment, the single audio signal/video signal output connector 5010 includes an integral combination of an audio signal output connector and a video signal output connector, and is associated with the single casing connector 20.

However, the portable audio device 50 may have an audio signal output connector and a video signal output connector that are separate from each other, which may be associated respectively with a casing connector for outputting an audio signal and a casing connector for outputting a video signal that are separate from each other.

Fifth Embodiment

A vehicle-mounted audio device according to a fifth embodiment of the present invention will be described below with reference to FIGS. 15 through 17.

Figure 15:
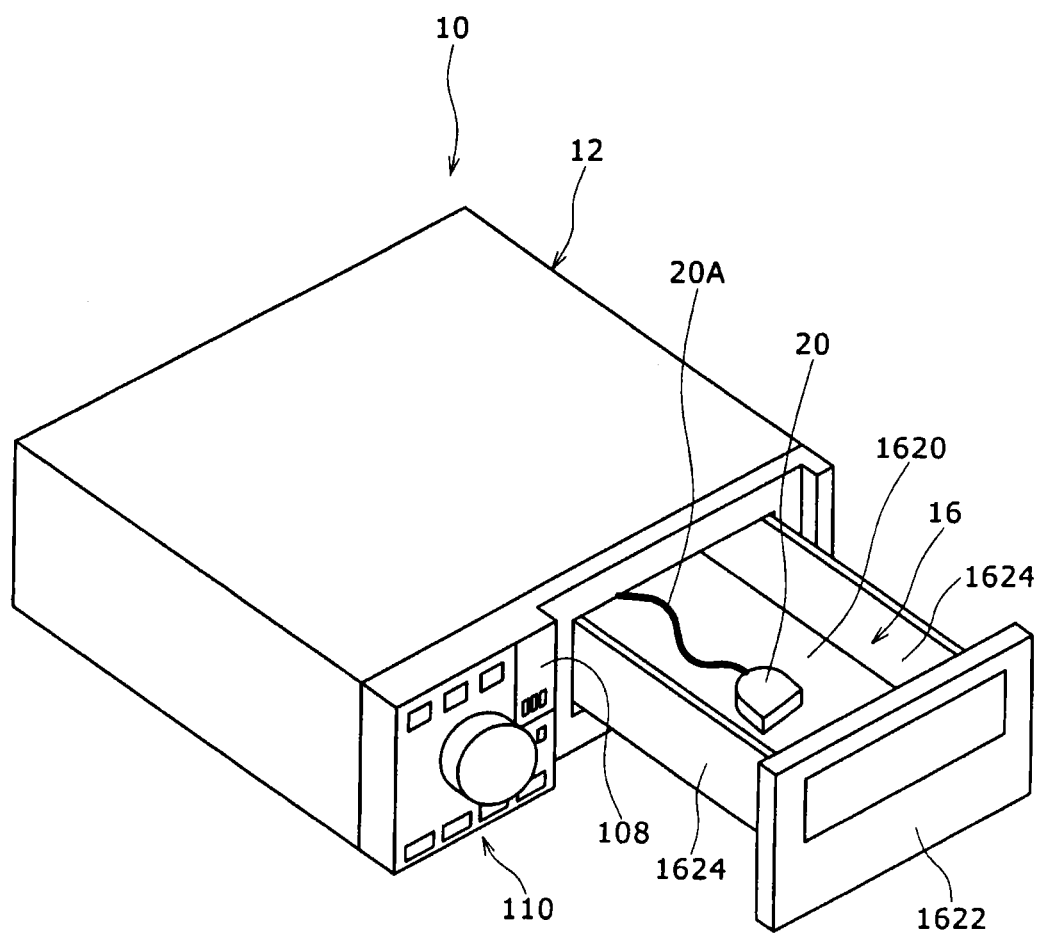
FIG. 15 is a perspective view of a vehicle-mounted audio device according to a fifth embodiment of the present invention, the view showing a housing being pulled out.
Figure 16:
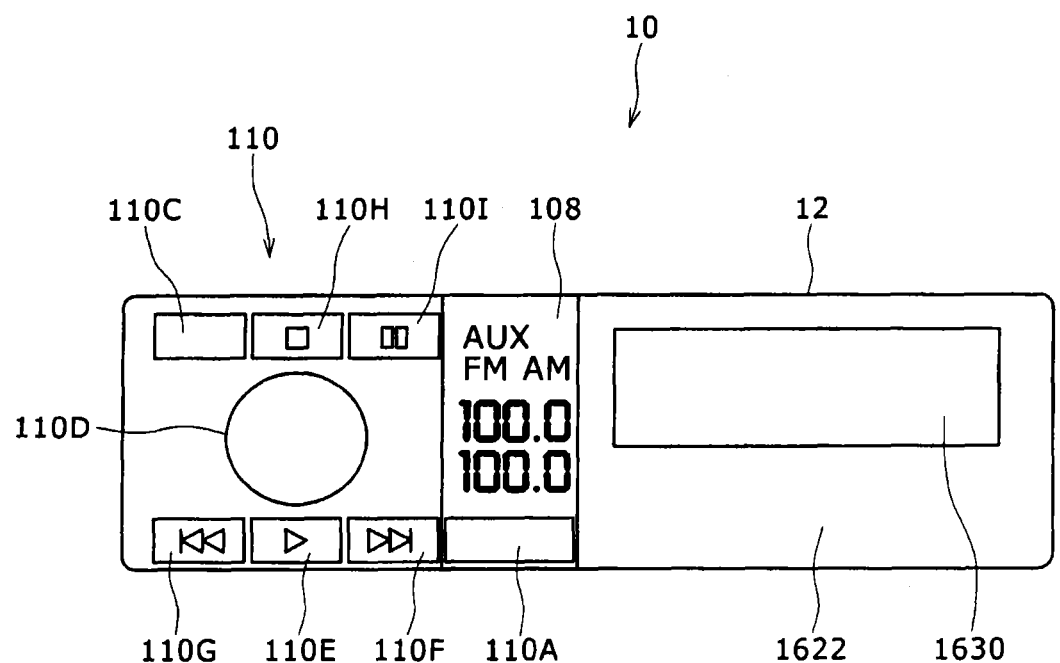
FIG. 16 is a front elevational view of a front panel of a casing of the vehicle-mounted audio device according to the fifth embodiment.
Figure 17:
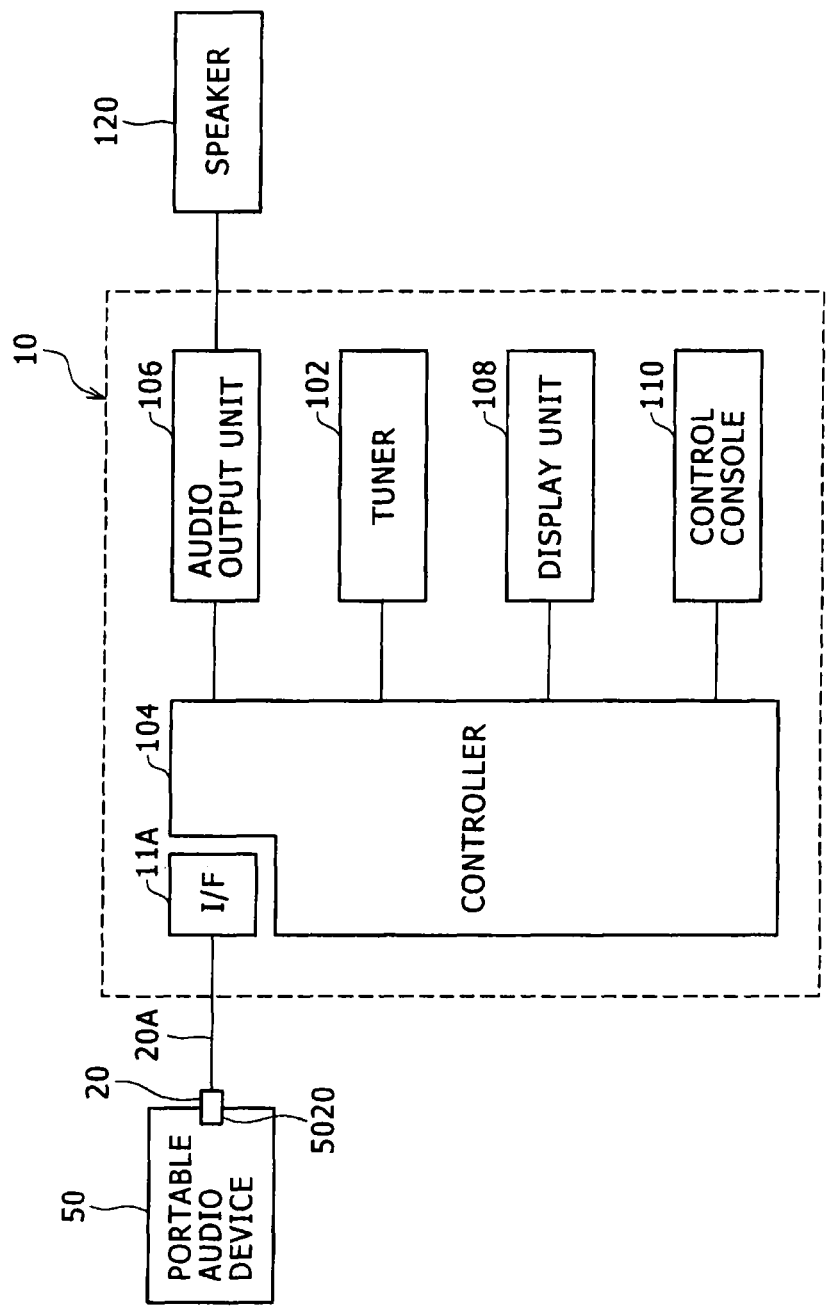
FIG. 17 is a block diagram of a control system of the vehicle-mounted audio device according to the fifth embodiment.

FIG. 15 shows in perspective a vehicle-mounted audio device according to the fifth embodiment, the view showing a housing being pulled out, FIG. 16 shows in front elevation a front panel of a casing of the vehicle-mounted audio device according to the fifth embodiment, and FIG. 17 shows in block form a control system of the vehicle-mounted audio device according to the fifth embodiment.

According to the fifth embodiment, the control console 110 of the vehicle-mounted audio device 10 is capable of also controlling the portable audio device 50.

As shown in FIG. 17, the portable audio device 50 has a data communication connector 5020 for communicating with an external device such as a computer or the like using a digital signal. According to the present embodiment, the portable audio device 50 performs data communications through the data communication connector 5020 according to USB (Universal Serial Bus).

The portable audio device 50 is thus capable of exchanging audio data of music contents bidirectionally between a recording medium of the portable audio device 50 and the external device through the data communication connector 5020.

The portable audio device 50 can be controlled in its operation, e.g., to start, stop, pause, fast-feed, and rewind a music reproduction, based on control commands (control signals) supplied from the external device via the data communication connector 5020.

The casing connector 20 of the vehicle-mounted audio device 10 is connected to the data communication connector 5020 of the portable audio device 50.

The vehicle-mounted audio device 10 includes an interface 11A connected between the controller 104 and the casing connector 20 for performing data communications between the controller 104 and the portable audio device 50 that is connected to the casing connector 20. The interface 11A operates under the control of the controller 104.

As shown in FIG. 16, the control console 110 of the vehicle-mounted audio device 10 includes the source selecting switch 110A, the power supply switch 110C, the volume knob 110D, as with the first embodiment, and, in addition, operation members for operating the portable audio device 50.

The operation members serve to control a process of reproducing music contents, and include a reproduction button 110E, a fast-feed button 110F, a rewind button 110G, a stop button 110H, and a pause button 110I, for example.

When the tuner 102 is selected by the source selecting switch 110A, some of the operation members for operating the portable audio device 50 are used as channel selecting buttons.

A process of reproducing music contents of the portable audio device 50 using the vehicle-mounted audio device 10 will be described below.

The casing connector 20 of the vehicle-mounted audio device 10 is connected to the data communication connector 5020 of the portable audio device 50, and the housing 16 which accommodates the portable audio device 50 therein is placed in the housing chamber 14.

When the source selecting switch 110A selects the portable audio device 50, the controller 104 brings itself into a state capable of data communications between itself and the portable audio device 10 through the interface 11A.

When the user operates the reproduction button 110E of the control console 110, the controller 104 sends a control command representing a reproduction request to the portable audio device 50, which operates in a reproduction mode and supplies audio data (digital signal) to the vehicle-mounted audio device 10.

The controller 104 supplies the supplied audio data (digital signal) to the audio output unit 106. The audio output unit 106 processes the audio data, converts the audio data into an analog signal, and amplifies the analog signal. Then, the audio output unit 106 supplies the amplified audio signal to the speaker 120, which outputs a corresponding sound.

When the user operates the fast-feed button 110F, the rewind button 110G, the stop button 110H, and the pause button 110I, the controller 104 sends control commands corresponding to these buttons to the portable audio device 50, which operate in corresponding modes.

The vehicle-mounted audio device 10 according to the fifth embodiment offers the same advantages as the vehicle-mounted audio device 10 according to the first embodiment. Furthermore, the portable audio device 50 can be operated with the control console 110 of the vehicle-mounted audio device 10 while the housing 16 with the portable audio device 50 placed therein is being accommodated in the housing chamber 14. Therefore, the portable audio device 50 can be operated more efficiently than with the first through fourth embodiments.

In the present embodiment, data communications between the vehicle-mounted audio device 10 and the portable audio device 50 are performed according to USB. However, data communications between the vehicle-mounted audio device 10 and the portable audio device 50 may be performed according to any of known communication formats.

In the present embodiment, both audio data and control commands are transmitted by way of data communications. However, control commands may be supplied from the vehicle-mounted audio device 10 to the portable audio device 50, and audio signals may be supplied as analog signals from the portable audio device 50 to the vehicle-mounted audio device 10.

In the present embodiment, audio data is supplied from the portable audio device 50 to the vehicle-mounted audio device 10. However, video data may be supplied from the portable audio device 50 to the vehicle-mounted audio device 10.

Sixth Embodiment

A vehicle-mounted audio device according to a sixth embodiment of the present invention will be described below with reference to FIG. 18.

Figure 18:
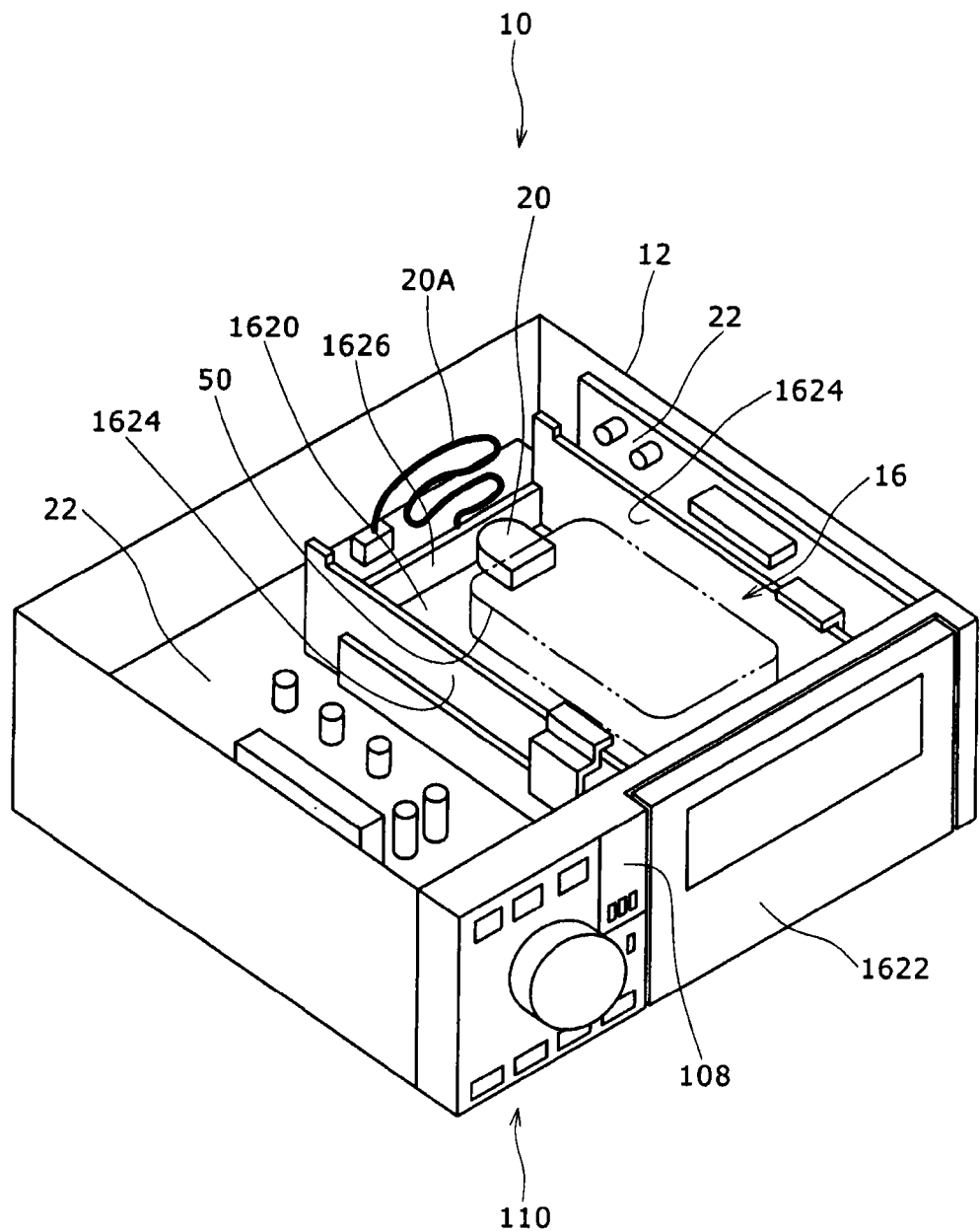
FIG. 18 is a perspective view of a vehicle-mounted audio device according to a sixth embodiment of the present invention, with an upper plate of a casing thereof being omitted from illustration.

FIG. 18 shows in perspective a vehicle-mounted audio device according to the sixth embodiment, with an upper plate of a casing thereof being omitted from illustration.

According to the sixth embodiment, as shown in FIG. 18, the casing connector 20 according to the fifth embodiment is fixed to the rear plate 1626 of the housing 16, and the data communication connector 5020 is connected to the casing connector 20 to support the portable audio device 50 immovably in the housing 16.

The vehicle-mounted audio device 10 according to the sixth embodiment offers the same advantages as the vehicle-mounted audio device 10 according to the fifth embodiment. Furthermore, the number of parts used is reduced as the holder 24 may be dispensed with.

Seventh Embodiment

A vehicle-mounted audio device according to a seventh embodiment of the present invention will be described below with reference to FIGS. 19 and 20.

Figure 19:
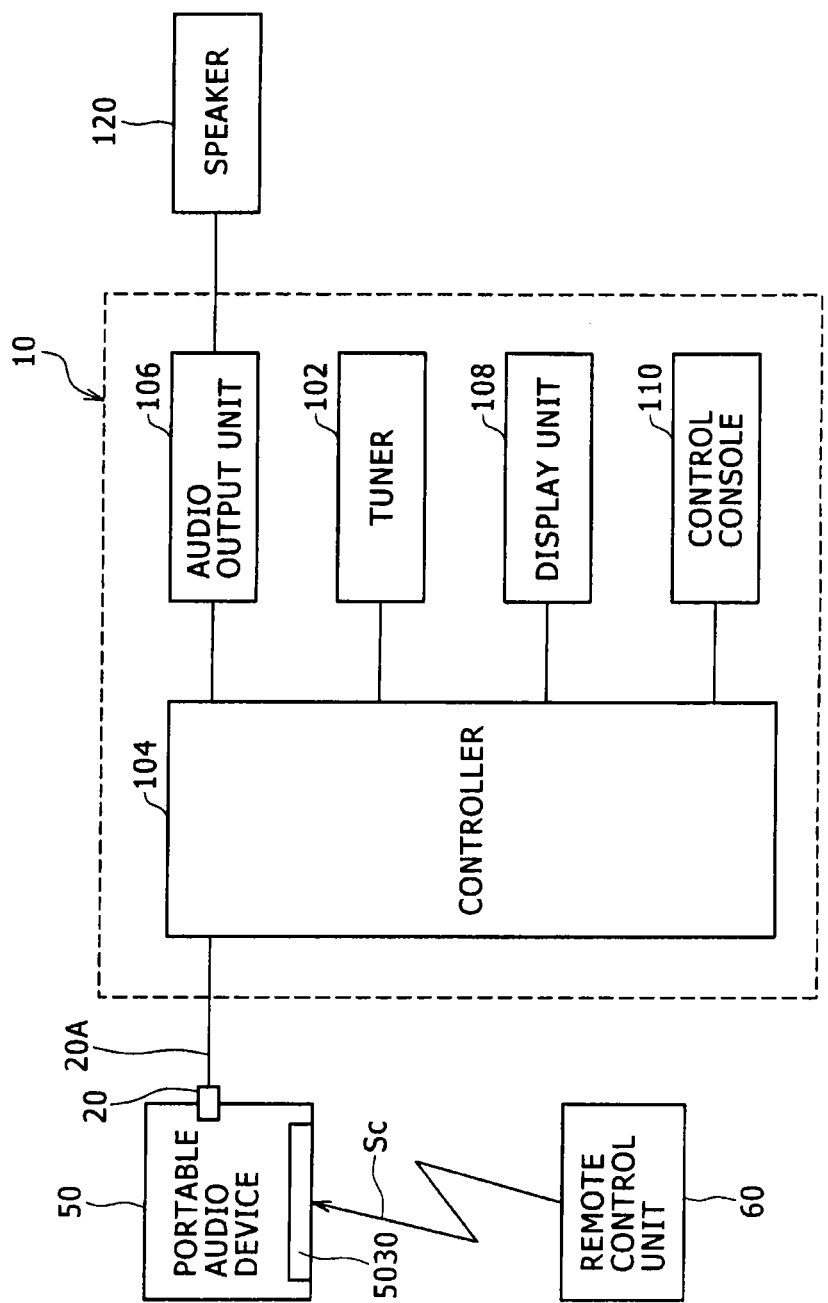
FIG. 19 is a block diagram of a control system of a vehicle-mounted audio device according to a seventh embodiment of the present invention.
Figure 20:
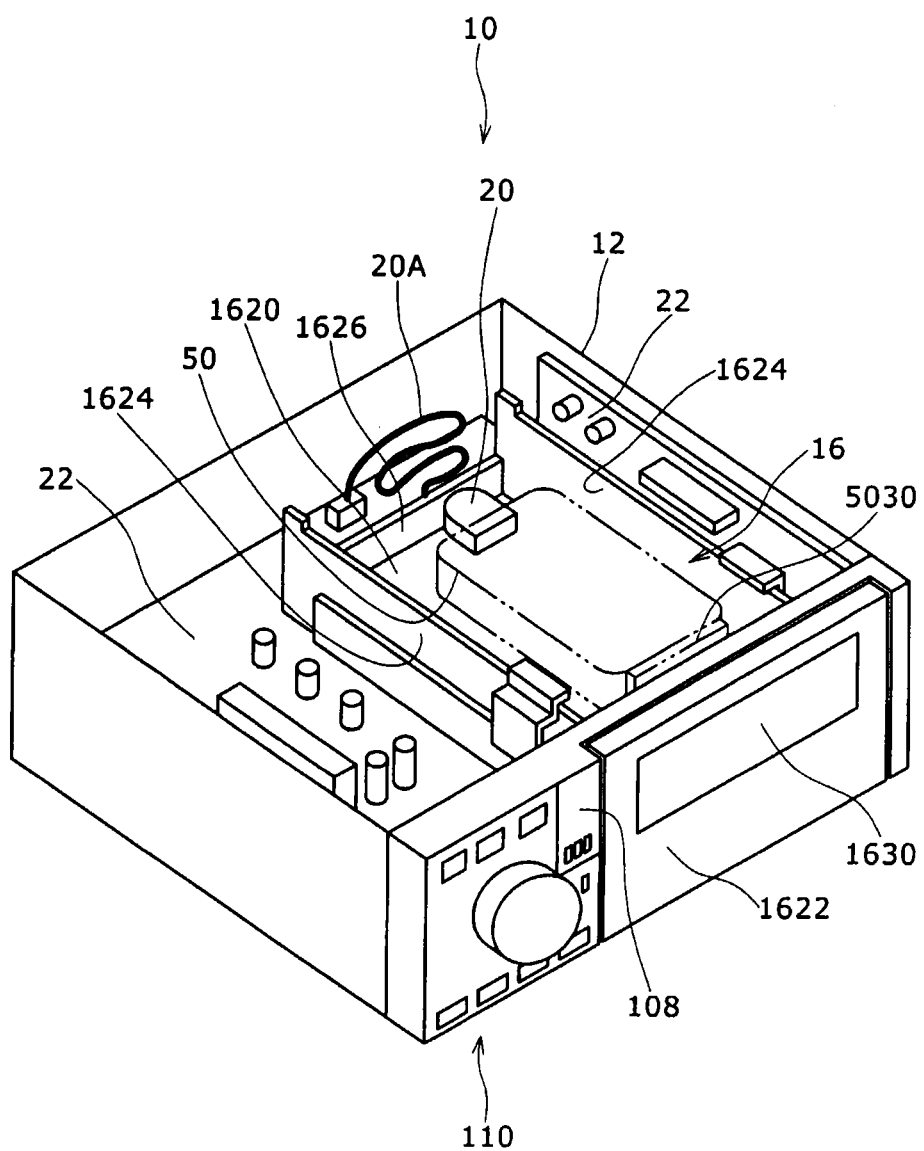
FIG. 20 is a perspective view of the vehicle-mounted audio device according to the seventh embodiment, with an upper plate of a casing thereof being omitted from illustration.

FIG. 19 shows in block form a control system of a vehicle-mounted audio device according to the seventh embodiment, and FIG. 20 shows in perspective the vehicle-mounted audio device according to the seventh embodiment, with an upper plate of a casing thereof being omitted from illustration.

According to the seventh embodiment, the portable audio device 50 can be remotely controlled by a remote control unit 60.

As shown in FIGS. 19 and 20, the portable audio device 50 includes a receiver 5030 on an outer surface of its casing.

The remote control unit 60 has various operation members which, when operated, cause the remote control unit 60 to transmit an infrared control signal (control command) Sc. When the infrared control signal Sc is received by the receiver 5030, the portable audio device 50 operates in a mode corresponding to the control signal, e.g., a reproduction mode, a fast-feed mode, a rewind mode, a stop mode, and a pause mode.

As shown in FIG. 20, the front plate 1622 of the housing 16 has an infrared-permeable window 1630 facing the receiver 5030 of the portable audio device 50 that is accommodated in the housing 16.

The vehicle-mounted audio device 10 according to the seventh embodiment offers the same advantages as the vehicle-mounted audio device 10 according to the first embodiment. In addition, when the portable audio device 50 is placed in the housing 16 with the receiver 5030 facing the window 1630, a control signal sent from the remote control unit 60 can be transmitted through the window 1630 and received by the receiver 5030. Therefore, the portable audio device 50 can be remotely controlled by the remote control unit 60 and hence can be used highly efficiently.

In the present embodiment, the receiver 5030 is integrally combined with the portable audio device 50. However, the receiver 5030 may be detachably mounted on the portable audio device 50.

In the above embodiments, the housing 16 is open upwardly. However, the housing 16 may be in the form of a rectangular frame for simply placing the portable audio device 50 thereon, or may be in the form of a box with a closed space defined therein, the box having a portion serving as a lid for openably closing the closed space. While the housing 16 may be of any of various structures, the housing 16 which is open upwardly is advantageous in that the portable audio device 50 can easily be taken into and out of the housing 16.

In the above embodiments, the housing 16 is removably accommodated in the housing chamber 14. However, the housing 16 may be dispensed with, and an outwardly open housing cavity may be defined in the casing 12, with a lid being openably disposed over the opening of the outwardly open housing cavity. The portable audio device 50 can be brought into and out of the outwardly open housing cavity through the opening 1402. However, the housing 16 according to the above embodiments is advantageous in that the portable audio device 50 can easily be taken into and out of the housing 16.

In the above embodiments, the portable audio device 50 that is operated using the vehicle-mounted audio device 10 reproduces data such as of music contents and video contents recorded in a disk-shaped recording medium, a built-in memory, a memory card, or a hard disk. However, the portable audio device used in the embodiment of the present invention is not limited to the illustrated portable audio device, but may be any of various portable electronic devices, such as a cellular phone with a music player function, having a music reproduction function provided in combination with a built-in memory, a memory card, or a hard disk.

It should be understood by those skilled in the art that various modifications, combinations, sub-combinations and alternations may occur depending on design requirements and other factors insofar as they are within the scope of the appended claims or the equivalent thereof.

What is claimed is:

1. A vehicle-mounted audio device comprising:
   a casing;
   a tuner disposed in said casing;
   audio output circuitry for amplifying and outputting an audio signal supplied from said tuner;
   a housing chamber defined in said casing, said housing chamber including an opening defined in a front panel of said casing;
   a housing configured to accommodate a portable audio device therein, said housing being configured to be moveably disposed in said housing chamber through said opening, said portable audio device being physically accessible when said housing is at least partially moved out of said housing chamber to a foremost position, and portable audio device being inaccessible when said housing is moved to a stored position;
   a lock mechanism that selectively locks said housing in said housing chamber and unlocks said housing from said housing chamber; and
   a casing connector electrically connected to said audio output circuitry and disposed in said housing for disengageably connecting to an audio signal output connector of the portable audio device, wherein
   said housing chamber has a guide for guiding said housing for movement into and out of said casing,
   said guide includes parallel guide rails disposed inside said casing that contact respective side plates of said housing, and
   said respective side plates include respective teeth portion on upper edges of said respective side plates that abut against respective stops disposed inside said casing to prevent said housing from being detached from said casing when said housing is partially moved out of said housing chamber to said foremost position.

2. The vehicle-mounted audio device according to claim 1, wherein said portable audio device is remotely controlled by remote control circuitry for transmitting a control signal, said housing having a front plate for openably closing said opening, said front plate including a window for transmitting said control signal therethrough.

3. The vehicle-mounted audio device according to claim 1, wherein said respective stops are disposed inside said casing and near said opening of said housing chamber so as to prevent said housing from being detached from said casing.

4. A vehicle-mounted audio device comprising:
   a casing;
   a tuner disposed in said casing;
   audio output circuitry that amplifies and outputs an audio signal supplied from said tuner;
   a housing chamber defined in said casing, said housing chamber including an opening defined in a front panel of said casing;
   a housing configured to accommodate a portable audio device therein, said housing being configured to be moveably disposed in said housing chamber through said opening, said portable audio device being physically accessible when said housing is at least partially moved out of said housing chamber to a foremost position, and said portable audio device being inaccessible when said housing is moved to a stored position;
   a lock mechanism that selectively locks said housing in said housing chamber and unlocks said housing from said housing chamber;
   a controller disposed in said casing that controls said tuner and the portable audio device accommodated in said housing;
   a casing connector electrically connected to said audio output circuitry and disposed in said housing for disengageably connecting to an audio signal output connector of said portable audio device; and
   an operation member that sends a control signal for controlling said portable audio device to said controller, wherein
   said housing chamber has a guide for guiding said housing for movement into and out of said casing,
   said guide includes parallel guide rails disposed inside said casing that contact respective side plates of said housing, and
   said respective side plates include respective teeth portion on upper edges of said respective side plates that abut against respective stops disposed inside said casing to prevent said housing from being detached from said casing when said housing is partially moved out of said housing chamber to said foremost position.

5. The vehicle-mounted audio device according to claim 4, wherein said housing is open at least upwardly.

6. The vehicle-mounted audio device according to claim 4, wherein said casing and said housing define a closed space for housing said portable audio device in said housing chamber while said housing is being housed in said housing chamber.

7. The vehicle-mounted audio device according to claim 5, wherein said housing includes a holder for holding said portable audio device immovably in said housing.

8. The vehicle-mounted audio device according to claim 7, wherein said holder comprises a surface fastener strip having a portion secured to said housing.

9. The vehicle-mounted audio device according to claim 4, wherein said casing connector is fixed to a wall of said housing and connected to said audio signal output connector of said portable audio device, thereby supporting said portable audio device immovably in said housing.

10. The vehicle-mounted audio device according to claim 4, wherein said housing includes a cushioning material for reducing vibrations and shocks applied to said casing, said portable audio device being mounted on said cushioning material.

11. The vehicle-mounted audio device according to claim 4, wherein said housing has a bottom plate and is open upwardly, said housing including a cushioning material disposed on said bottom plate for reducing vibrations and shocks applied to said casing, said portable audio device being mounted on said cushioning material, and wherein said housing includes another cushioning material for reducing vibrations and shocks applied to said casing, said another cushioning material being mounted on an upper wall of said housing chamber which faces said portable audio device while said housing is being housed in said housing chamber.

12. The vehicle-mounted audio device according to claim 4, further comprising:
an actuator for moving said housing into and out of said housing chamber.

13. The vehicle-mounted audio device according to claim 4, wherein said operation member is mounted on the front panel of said casing.

14. The vehicle-mounted audio device according to claim 4,
wherein said portable audio device has a video signal output connector for outputting a video signal, said controller including video output circuitry for outputting the video signal, and
wherein the vehicle-mounted audio device further includes another casing connector for the video signal which is electrically connected to said video output circuitry and disposed in said housing, said another casing connector for the video signal being disengageably connected to said video signal output connector of the portable audio device.

15. The vehicle-mounted audio device according to claim 14, wherein said casing connector which is electrically connected to said audio output circuitry and said another casing connector for the video signal are integrally combined with each other, and said audio signal output connector and said video signal output connector are integrally combined with each other.

16. An automobile including a vehicle-mounted device, said vehicle-mounted device comprising:
a casing;
a tuner disposed in said casing;
audio output circuitry that amplifies and outputs an audio signal supplied from said tuner;
a housing chamber defined in said casing,
said housing chamber including an opening defined in a front panel of said casing;
a housing configured to accommodate a portable audio device therein, said housing being configured to be moveably disposed in said housing chamber through said opening, said portable audio device being physically accessible when said housing is at least partially moved out of said housing chamber to a foremost position, and said portable audio device being inaccessible when said housing is moved to a stored position;
a lock mechanism that selectively locks said housing in said housing chamber and unlocks said housing from said housing chamber; and
a casing connector electrically connected to said audio output circuitry and disposed in said housing for disengageably connecting to an audio signal output connector of the portable audio device, wherein
said front panel of said casing faces a passenger compartment of the automobile,
said housing chamber has a guide for guiding said housing for movement into and out of said casing,
said guide includes parallel guide rails disposed inside said casing that contact respective side plates of said housing, and
said respective side plates include respective teeth portion on upper edges of said respective side slates that abut against respective stops disposed inside said casing to prevent said housing from being detached from said casing when said housing is partially moved out of said housing chamber to said foremost position.

17. The automobile according to claim 16, wherein said casing is incorporated in a recess in a front panel or a center console panel of the automobile.

18. An automobile including a vehicle-mounted device, said vehicle-mounted device comprising:
a casing;
a tuner disposed in said casing;
audio output circuitry for amplifying and outputting an audio signal supplied from said tuner;
a housing chamber defined in said casing, said housing chamber including an opening defined in a front panel of said casing;
a housing being configured to accommodate a portable audio device therein, said housing being configured to be moveably disposed in said housing chamber through said opening, said portable audio device being physically accessible when said housing is at least partially moved out of said housing chamber to a foremost position, and said portable audio device being inaccessible when said housing is moved to a stored position;
a lock mechanism that selectively locks said housing in said housing chamber and locks said housing from said housing chamber;
a controller disposed in said casing for controlling said tuner and the portable audio device accommodated in said housing;
a casing connector electrically connected to said audio output circuitry and disposed in said housing for disengageably connecting to an audio signal output connector of said portable audio device; and
an operation member that sends a control signal for controlling said portable audio device to said controller, wherein
said front panel of said casing faces a passenger compartment of the automobile,
said housing chamber has a guide for guiding said housing for movement into and out of said casing,
said guide includes parallel guide rails disposed inside said casing that contact respective side plates of said housing, and
said respective side plates include respective teeth portion on upper edges of said respective side plates that abut against respective stops disposed inside said casing to prevent said housing from being detached from said casing when said housing is partially moved out of said housing chamber to said foremost position.

19. The automobile according to claim 18, wherein said casing is incorporated in a recess in a front panel or a center console panel of the automobile.

* * * * *